United States Patent [19]
Savioli

[11] Patent Number: 6,009,780
[45] Date of Patent: Jan. 4, 2000

[54] PROCESS, APPARATUS AND TOOL FOR CUTTING A TUBULAR BAR

[75] Inventor: Leopoldo Savioli, Alfonsine, Italy

[73] Assignee: Sica S.P.A., Alfonsine, Italy

[21] Appl. No.: 08/919,078

[22] Filed: Aug. 27, 1997

[30] Foreign Application Priority Data

Aug. 30, 1996 [EP] European Pat. Off. ............... 96830457

[51] Int. Cl.⁷ .................................................. B23B 27/08
[52] U.S. Cl. ................... 82/53.1; 83/178; 83/184
[58] Field of Search .................. 83/178, 184, 54; 82/53.1

[56] References Cited

U.S. PATENT DOCUMENTS

| | | | |
|---|---|---|---|
| 3,293,963 | 12/1966 | Carroll et al. | 83/178 |
| 3,771,393 | 11/1973 | Gatto et al. | 82/53.1 |
| 4,084,463 | 4/1978 | Kanbara et al. | |
| 4,467,508 | 8/1984 | Fjällström | |
| 4,693,149 | 9/1987 | Sireix | 82/53.1 |
| 4,727,783 | 3/1988 | John, Jr. | 82/53.1 |
| 4,794,684 | 1/1989 | Vanlauwe | |

FOREIGN PATENT DOCUMENTS

| | | |
|---|---|---|
| 3138339A1 | 7/1982 | Germany |
| 901393 | 7/1962 | United Kingdom |
| 1392637 | 4/1975 | United Kingdom |
| 2120591A | 12/1983 | United Kingdom |

*Primary Examiner*—Rinaldi I. Rada
*Assistant Examiner*—Sean Pryor
*Attorney, Agent, or Firm*—Dvorak & Orum

[57] ABSTRACT

A process carried out by an apparatus for cutting a tubular bar comprises a first cutting stage performed by a first disc-shaped rotary cutting tool, oriented so as to rotate about an axis parallel to a line of extension of the bar and also movable gradually along the contour of the bar, which is made to penetrate into the peripheral wall of the bar over a distance less than the thickness thereof, forming a groove therein. In a second and successive cutting stage, a second stationary cutting tool, oriented transversely with respect to the line of extension of the bar and movable along the contour of the bar inside the groove, is made to penetrate into the remaining thickness of the peripheral wall so as to cause gradual shearing of the bar.

6 Claims, 3 Drawing Sheets

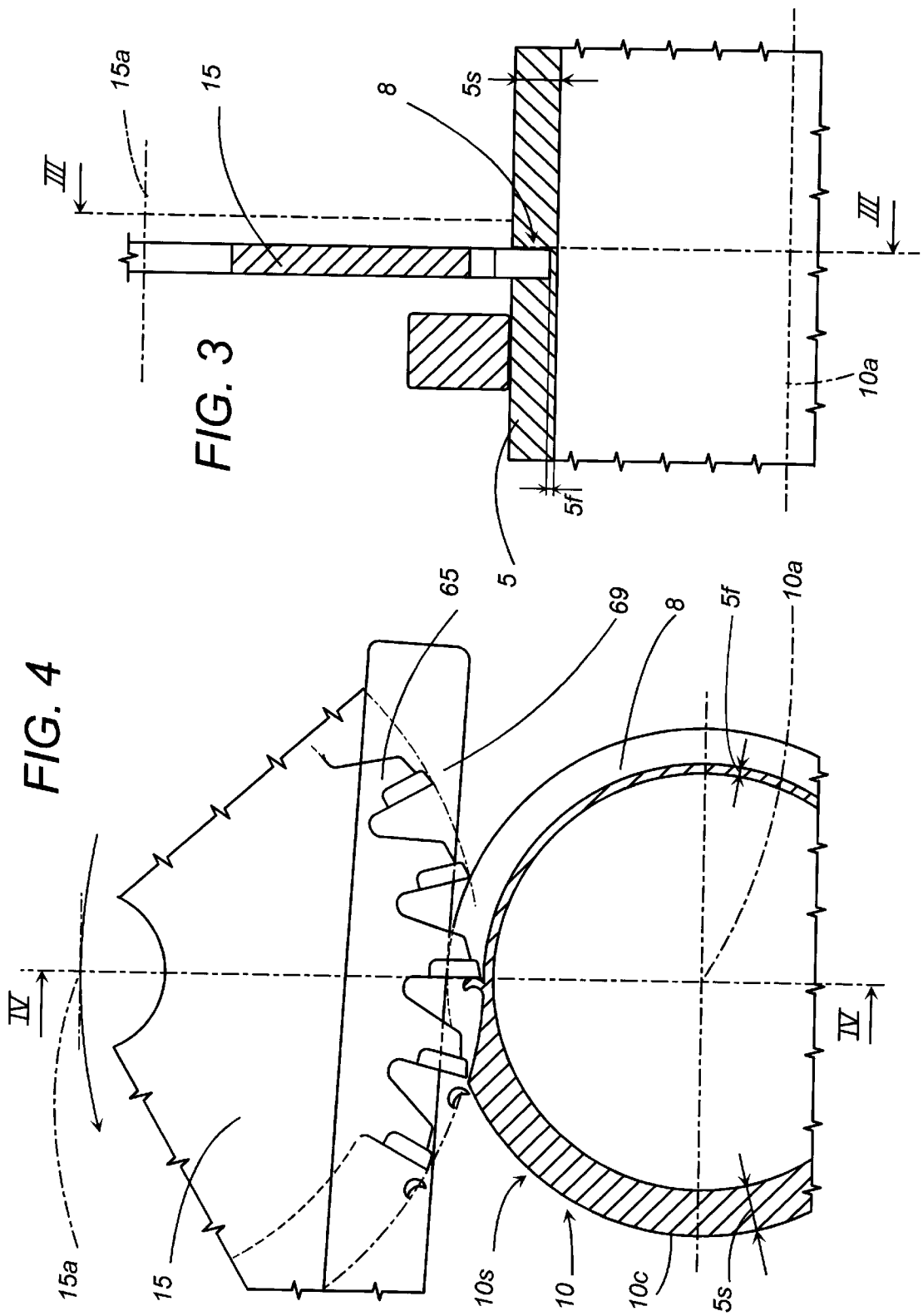

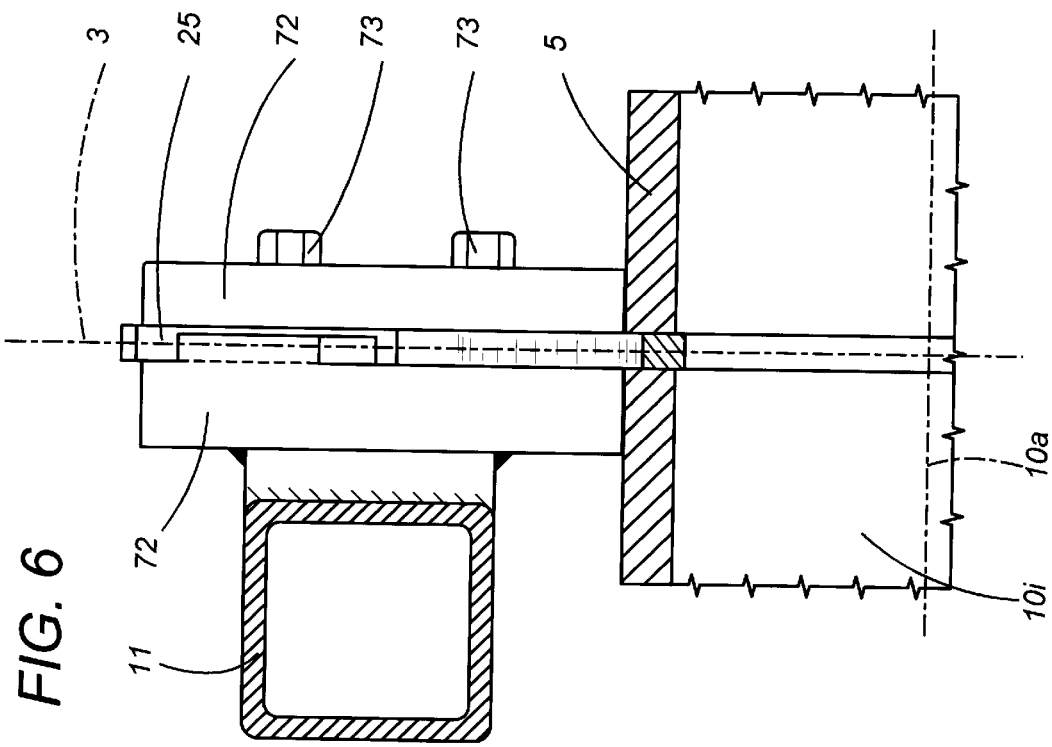
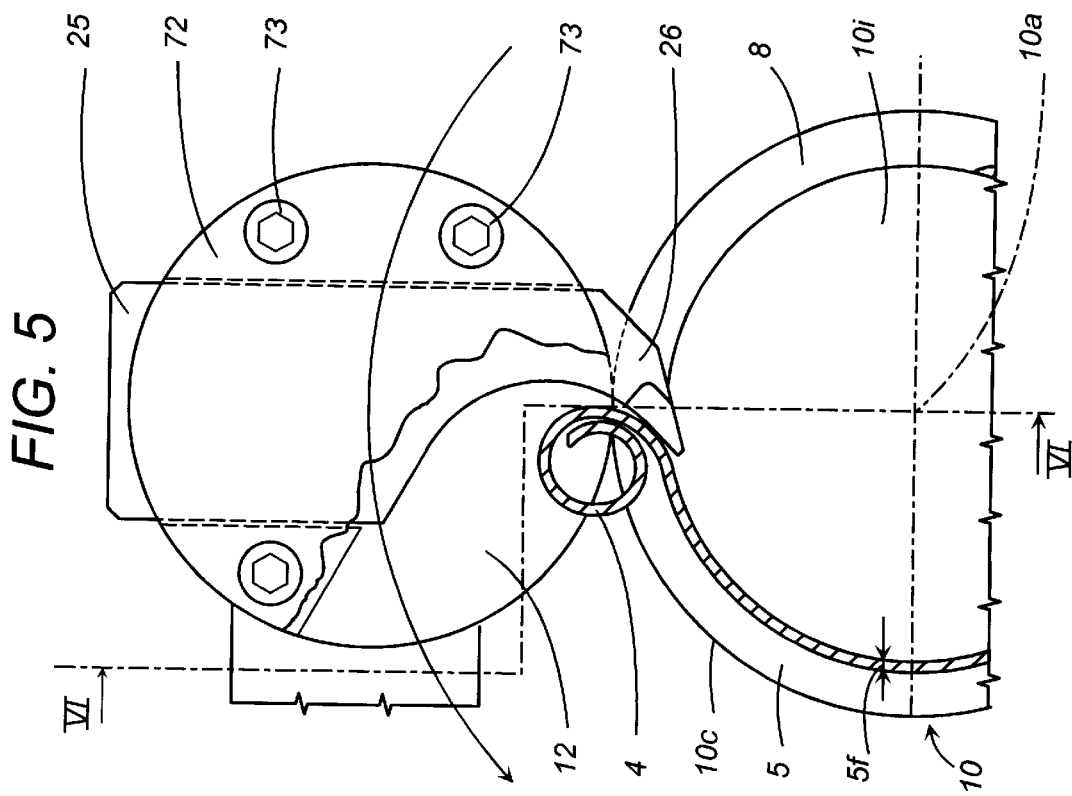

PROCESS, APPARATUS AND TOOL FOR CUTTING A TUBULAR BAR

BACKGROUND OF THE INVENTION

The present invention relates to a process, an apparatus and a tool for cutting a tubular bar.

In particular the present invention relates to the cutting of tubes made of plastic to which specific reference is made below, without thereby losing its general nature. In the technical sector concerning in particular the manufacture of tubes made of plastic it is known to perform cutting of the tube into segments of predetermined length by means of an apparatus of the type comprising a support frame on which there is mounted a drum rotatable about a horizontal axis coinciding with the axis of the tube to be cut. The drum has centrally a hole so as to be passed through coaxially by the tube to be cut, and supports, on a rotating surface arranged transversely with respect to the axis, a cutting arm having mounted on its end a circular cutting blade which operates around the tube itself Apparatuses of this type may be used effectively also for the cutting of plastic tubes which are manufactured by means of continuous extrusion and, as such, have a continuous progression, extending along their longitudinal axis. In this case, the aforementioned frame is actuated by a movable carriage which is guided along the extrusion axis and moved by means of pneumatic/electric systems which effect the displacements thereof in phase with extrusion and the execution of each cut. These cutting apparatuses, although efficient and precise, also involve, however, some drawbacks arising from the fact that, during cutting of the entire thickness of the tubes, a portion, albeit small, of the shavings produced by the blade teeth is not conveyed towards the outside of the tube by the teeth of the blade itself and penetrates inside the tube, despite the fact that the apparatus is also provided with a cowling for removal of the shavings, which is associated with the blade and connected to a motor-driven aspirator for removing the shavings from the cutting zone.

With regard to the formation of plastic tubes, it is known that they normally have a cylindrical part and a flared or "belled" part, obtained with the aid of belling blocks which operate on the inside of the tube on the material thermoplastically heated in special ovens. If, inside the tube, shavings should be present in the portion of the tube intended to enter the heating oven, said shavings, during the time spent inside in the oven, tend to burn, with the emission of toxic gases.

If, on the other hand, the shavings contained in the tube should not enter inside the oven, but remain attached to the inner wall of the tube, during forming with the block the latter would crush them against the inner wall of the belling, preventing correct use thereof.

If, finally, shavings should be present in a more internal zone of the belling not affected by the aforementioned operations, the shavings could however cause blockage of the tube control members (taps, gate valves) if the tube were to be used for example as a conduit.

Finally, it must be mentioned that cutting devices which use circular cutting blades are somewhat noisy.

SUMMARY OF THE INVENTION

The object of the present invention is therefore that of eliminating the drawbacks mentioned above. The invention, as characterized by the claims, solves the problem by means of a cutting process which eliminates any possibility of accidental intrusion of the aforementioned shavings inside the tube both during and after cutting. In accordance with the invention, the cutting process uses, during a first stage, a circular cutting blade performing a cut which circumferentially penetrates the thickness of the tube wall, without passing through it, down to a controlled depth, less than the thickness of the peripheral wall of the tube, leaving the final cut, resulting in sectioning of the tube into two parts, to be carried out during a second cutting stage, during which a stationary-bar tool removes the thin remaining wall with continuous shavings which are forced to roll up spirally outside the tube and transversally with respect to the tube itself, eliminating any problem of introduction of the shavings inside the latter.

The shavings, produced in this way, furthermore have an extremely compact shape such that the user is able to recycle the material removed during cutting. Moreover, as a result of the process in question, the amount of noise may be reduced significantly. In fact, the noise caused by a cutting blade or disc passing through the entire thickness of the tube wall is much greater than that caused by the disc itself passing through a limited part of the entire thickness.

This technical effect can be clearly understood if one considers first of all that the noise is produced by the discontinuity with which each blade tooth engages with the material, performing removal thereof In the case of a cut passing through the entire thickness of the tube, the noise source is transferred inside the empty volume of tube, which, therefore acting like a resonance chamber, transmits externally and with an amplification effect the noise produced by the source. On the other hand, in the case where the tool passes through a limited part of the thickness, without passing through the internal cavity of the tube, there is a reduction in the noise as a result of two associated causes: the first is due to the fact that the intensity of the noise produced is proportionally lower, with a reduction in the thickness of the material removed; the second is due to the fact that the noise source, remaining confined to the outside of the tube, does not undergo any amplification, so that the the cutting tool is decidedly more silent.

The process in question, therefore, involves the use of a pair of cutting means, one with a circular blade and the other with a bar-type tool, which operate at successive moments with respect to one another and in a different operational manner with regard to the internal cavity of the tube, also being able to be used effectively, in particular, on any tube made of plastic (PVC, ABS, PP, PEHD, PELD, etc.).

The present invention moreover relates to a cutting apparatus which implements the aforementioned process, as well as a tool used in said process.

BRIEF DESCRIPTION OF THE DRAWINGS

The invention is explained in greater detail below, with the aid of the drawings which show an embodiment thereof purely by way of a non-limiting example, in which:

FIG. 3 is a schematic and partial view of the cutting operation carried out by a first rotating cutting tool, performed with a circular blade, along the sectioning line IV—IV of FIG. 4;

FIG. 4 is a view along the sectioning line III—III of FIG. 3;

FIG. 5 is a schematic and partial view of the cutting operation performed by a second stationary and a shaped cutting tool;

FIG. 6 is a view along the sectioning line VI—VI according to FIG. 5.

DESCRIPTION OF THE PREFERRED EMBODIMENTS

Figure 1:
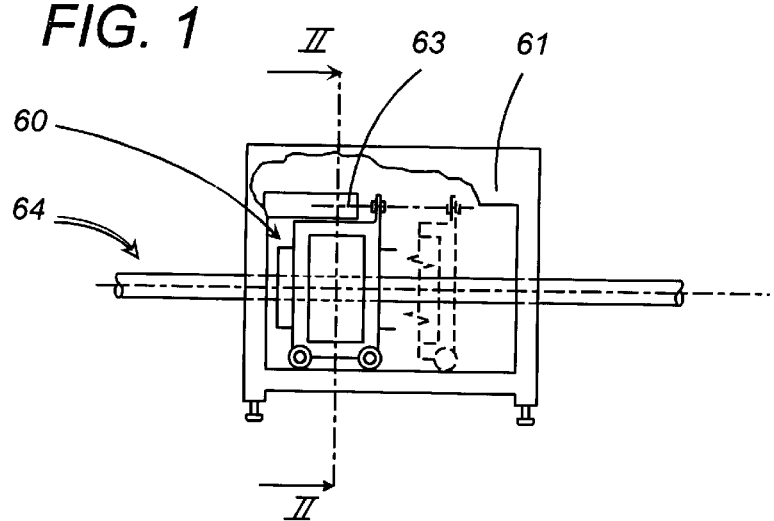
FIG. 1 illustrates, schematically and with some parts removed, the apparatus in question during a process involving continuous extrusion of plastic tubes.
Figure 2:
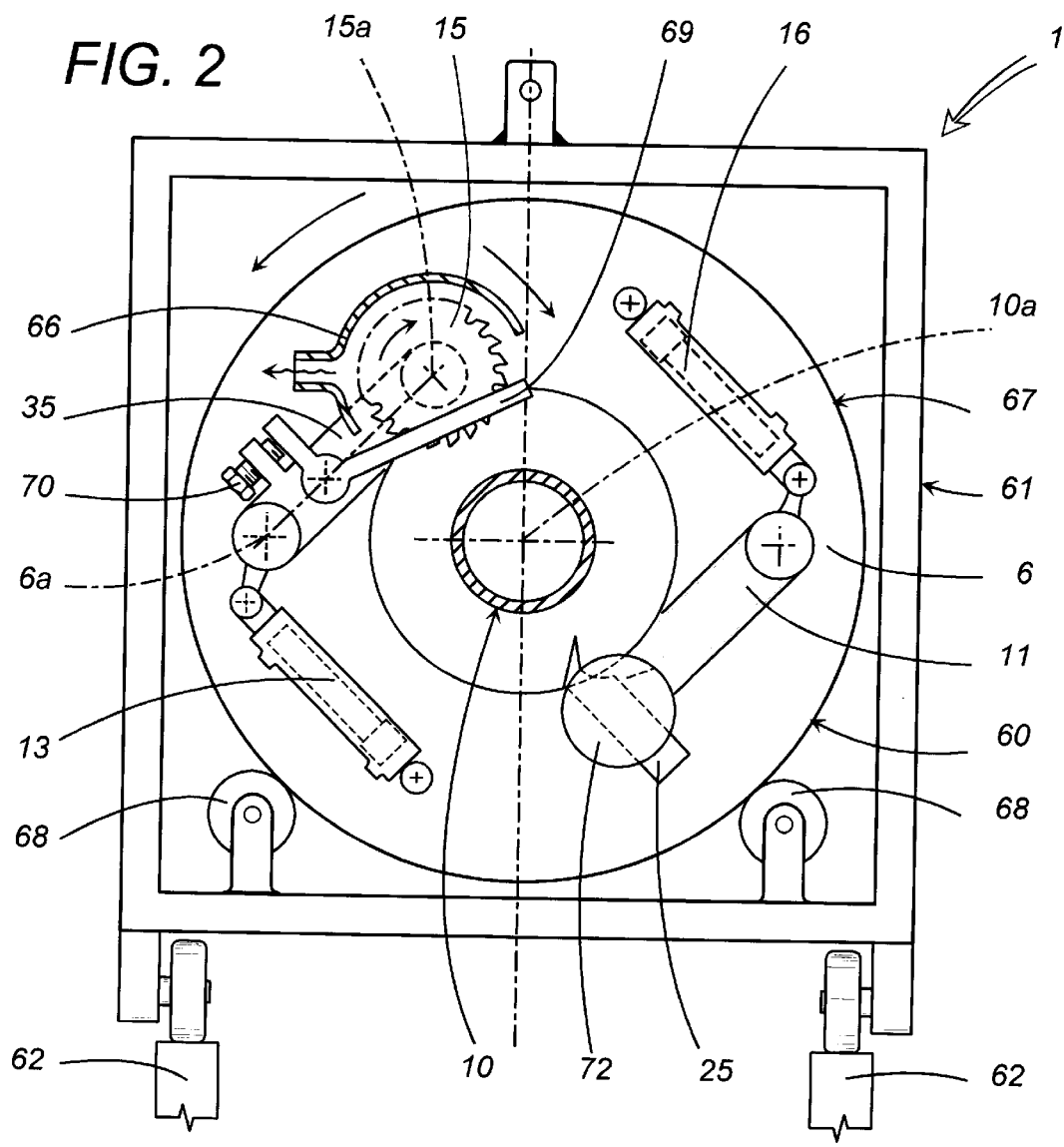
FIG. 2 illustrates schematically a view of the apparatus according to FIG. 1, sectioned along the sectioning line II—II.

With reference to the attached drawings, FIGS. 1 and 2 show by way of example a cutting apparatus 1 which is used in a process involving continuous extrusion of a tubular bar 10 defined by a hollow profiled circular section 10s which extends along a straight line 10a and which, in particular, consists of a cylindrical plastic tube.

The apparatus 1 is mounted on a cutting machine 60 which is arranged along an extrusion line 64, shown partially, and is provided with a carriage 61 which travels on two guides 62 parallel to the line 10a of extension of the tubular bar 10 and is moved by the action of associated actuator means 63. The latter, in particular, consist of a pneumatic cylinder which is actuated upon signalling by suitable devices for measuring the length of the bar 10 so as to effect displacements of the carriage 61 in both directions of the extrusion line 64 in suitable phase-correlation with the extrusion process and with the cutting process itself The apparatus 1 comprises (FIG. 2): a first disc-shaped rotary cutting tool 15, which has, on its periphery, a plurality of teeth 65 and is contained inside a cowling 66 connected to a conventional system for suction of the shavings; a first arm 35 supporting the first cutting tool 15; and a surface 6 provided centrally with a hole and passed through by the tubular bar 10 to be cut, carrying the first support arm 35. The surface 6 is arranged transversely with respect to the line 10a of extension of the tubular bar 10 and is integrally mounted on a drum 67, supported by the carriage 61, which rests on rotating rollers 68 and is motorized so as to rotate coaxially with the tubular bar 10 which passes through the surface 6, the drum 67 and the carriage 61, as shown in FIG. 1.

In particular, the first arm 35 is mounted on the surface 6, rotoidally coupled about a fixed axis 6a, parallel to the line 10a of extension, so as to be angularly oscillating upon operation of first associated actuator means 13 consisting, by way of example, of a fluid cylinder associated with the arm 35, on the opposite side to the first cutting tool 15 with respect to the axis 6a of rotation.

The first arm 35 is equipped moreover with a feeler device 69 for the tubular bar 10, fixed rotatably to the first arm 35 and adjustable via screw adjusting means 70. The feeler device 69 moves parallel to the surface 6, in the same manner as the first cutting tool 15, and rests on the tubular bar 10, during the cutting operation, so as to limit the depth with which the first cutting tool 15 penetrates into the thickness of the peripheral wall 5 of the tubular bar 10, as will become clearer in the the description below.

Since the surface 6 is integral with the drum 67, rotation of the latter causes the first cutting tool 15 to move gradually along the contour 10c of the bar 10 in a condition where said first cutting tool 15 is made to penetrate in the peripheral wall S over a distance controlled by the setting of the feeler device 69.

The apparatus 1 comprises moreover a second cutting tool 25, formed in particular by a stationary bar with a single cutting edge, and a second arm 11 which supports the second cutting tool 25 in a position diametrically opposite the first cutting tool 15 and in a condition where said second tool 25 is oriented transversally with respect to the line 10a of extension of the tubular bar 10 to be cut.

The second arm 11 is supported by the surface 6 in a similar way to the first arm 35; it is therefore also rotoidally mounted on the surface 6 so as to oscillate angularly, transversely with respect to the axis 10a of extension of the bar 10, upon operation of second associated actuator means 16 consisting for example, in this case also, of a fluid cylinder.

The second arm 11 is associated with the surface 6 in a condition such that it is able to position its tool 25 inside the groove 8 formed on the tubular bar 10 following the operation performed by the first cutting tool 15, causing it to penetrate into the side wall 5 of the bar 10 by a depth corresponding to, or greater than, the residual depth 5f of said wall 5 in the region of the groove 8, as can be seen in particular from a comparison of FIGS. 4 and 6.

From FIG. 5 it can be noted, moreover, that the second cutting tool 25 is mounted on a tool carrier 72 with the possibility of sliding in an adjustable manner transversely with respect to the line 10a of extension of the tubular bar 10, and of being fixed by means of screws 73 in the desired working position.

As regards the constructional form of the second cutting tool 25, from FIG. 5 it can be seen in particular that the latter is formed so as to define, in combination with the peripheral wall 5 of the tubular bar 10, a recess 12 for receiving the removed shaving 4, which recess 12 is totally and perfectly closed off from intercommunication with the internal cavity 10i of the tubular bar 10, such that the shaving 4 of material removed by said second cutting tool 25 does not have any possibility of reaching the inside of the tube.

Moreover, said second cutting tool 25 has at its operative end a cutting shape 26 designed to cause the formation of a single, continuous, uninterrupted shaving 4 of uniform cross-section, which is wound up on itself spirally, lying on a plane 3 which is transverse with respect to the line 10a of extension of the bar 10.

The uniform cross-sectional shape of the shaving 4 and its spiral-shaped configuration allows not only the possibility of recovery and recycling of material, but also extremely silent operation during the cutting operations involving shearing and sectioning of the tubular bar 10.

During use, the aforementioned apparatus 1 performs a cutting process which can be broadly divided up into two separate and successive cutting stages.

During a first cutting stage, the first cutting tool 15 is made to penetrate into the thickness 5s of the peripheral wall 5 in a controlled manner by the feeler device 69 by an amount less than the total thickness 5s of said peripheral wall 5, while correspondingly the second tool 25 remains at a standstill in an associated inoperative condition where it is separated from the tubular bar 10.

Upon rotation of the drum 67, the first cutting tool 15 engages into the peripheral wall 5, forming therein an annular groove 8 with a depth less than the thickness 5s. During the second cutting stage, the second tool 25 is inserted into the annular groove 8, formed by the first cutting tool 15, and is made to penetrate into the peripheral wall 5 by a quantity equal to, or greater than, the residual thickness 5f of the peripheral wall 5 in the region of the groove 8, such that, when the surface 6 supporting said tool 25 is rotated, the latter gradually travels over the contour 10c of the tubular bar 10, causing gradual sectioning and division of the bar 10 into two distinct and separate parts.

The invention thus conceived may be subject to numerous modifications and variations, all of which falling within the scope of the inventive idea. Moreover, all the details may be replaced by technically equivalent elements.

What is claimed:

1. An apparatus for cutting a hollow, tubular bar having a circular cross-section defined by a wall having a wall thickness, said bar having a longitudinal axis disposed generally parallel to a longitudinal extension axis of said apparatus, comprising:

a mounting surface having a centrally disposed opening for receiving therethrough said bar, said surface disposed transversely with respect to said longitudinal extension axis and being integrally mounted on a rotatable drum;

a first arm having a first and a second end, said first end pivotably mounted to said mounting surface so as to be rotationally movable about a fixed axis, said fixed axis disposed generally parallel to said longitudinal extension axis;

a first rotary cutting tool connected to said second end of said first arm, said first cutting tool transversely disposed relative to said bar;

a first actuator means connected to said mounting surface and attached to said first end of said first arm so as to rotate said first arm and the first cutting tool towards and away from the bar upon actuation of said first actuator means, wherein upon actuation, the first rotary cutting tool is adapted to partially penetrate into the wall thickness of the tubular bar so as to form an annular groove in said wall, said groove having a depth which defines a residual cross-sectional thickness in said tube;

a second arm and a second, stationary cutting tool, said second arm having a first and a second end, wherein said first end is pivotably mounted to said mounting surface and said second end fixedly receives thereon said second cutting tool, said second, stationary cutting tool transversely oriented with respect to the longitudinal axis of the bar, said first end of said second arm being pivotably mounted on said surface so as to be rotationally movable about a second fixed axis, said second fixed axis disposed generally parallel to said longitudinal extension axis; and a second actuator means connected to said mounting surface and attached to said first end of said second arm so as to rotate said second arm and said second, stationary tool towards and away from said bar;

said second tool adapted to penetrate said residual cross-section thickness of said tube which remains inside of the groove and to cut the bar into two separate parts, each of said first and second cutting tools movable respective the longitudinal axis of said bar.

2. The apparatus according to claim 1, wherein the second cutting tool is adjustable in a transverse direction respective said longitudinal axis of the bar.

3. The apparatus according to claim 1, wherein the second cutting tool is mounted in an opposed relationship to the first cutting tool.

4. The apparatus according to claim 1, wherein the second cutting tool is formed with a recess therein for receiving a removed shaving, which forms when said second cutting tool is operated, said recess closed from intercommunication with an internal cavity of the tubular bar.

5. The apparatus according to claim 1, wherein the second cutting tool is a cutting blade.

6. The apparatus according to claim 4, wherein the second cutting tool is formed with a cutting shape which forms a continuous, spirally-shaped shaving when said second cutting tool is operated, said shaving spirally wound upon itself and lying in a plane transverse with respect to the longitudinal axis of the bar.

\* \* \* \* \*